(12) United States Patent
Jarde

(10) Patent No.: US 12,437,171 B2
(45) Date of Patent: Oct. 7, 2025

(54) METHOD AND DEVICE FOR ACCESSING A WEB RESOURCE

(71) Applicant: MOONIFY SAS, Montpellier (FR)

(72) Inventor: Pascal Jarde, Montpellier (FR)

( * ) Notice: Subject to any disclaimer, the term of this patent is extended or adjusted under 35 U.S.C. 154(b) by 0 days.

(21) Appl. No.: 18/291,448

(22) PCT Filed: Jul. 23, 2021

(86) PCT No.: PCT/EP2021/070695
§ 371 (c)(1),
(2) Date: May 20, 2024

(87) PCT Pub. No.: WO2023/001381
PCT Pub. Date: Jan. 26, 2023

(65) Prior Publication Data
US 2024/0211709 A1    Jun. 27, 2024

(51) Int. Cl.
*G06K 7/14* (2006.01)
(52) U.S. Cl.
CPC ......... *G06K 7/1417* (2013.01); *G06K 7/1443* (2013.01)
(58) Field of Classification Search
CPC ............... G06K 7/1417; G06K 7/1443; G06K 7/10722; G06K 7/1434; G06K 19/06037; G06K 19/08; G06K 19/14; A63F 13/42; A63F 13/60; A63F 13/213; G06F 2221/2119; H04L 63/0838; H04W 12/06; H04W 12/77
See application file for complete search history.

(56) References Cited

U.S. PATENT DOCUMENTS

| | | | |
|---|---|---|---|
| 2003/0042317 A1* | 3/2003 | Behm | G07D 7/026 235/487 |
| 2004/0112962 A1* | 6/2004 | Farrall | G08B 13/2442 235/462.01 |
| 2015/0178521 A1* | 6/2015 | Ching | G06K 5/00 235/375 |

* cited by examiner

*Primary Examiner* — Matthew Mikels
(74) *Attorney, Agent, or Firm* — Patshegen IP; Moshe Pinchas

(57) ABSTRACT

The method (10) for accessing a web resource comprises:
a step (11) of capturing at least one image of an object bearing a visible graphic code comprising two portions;
a step (12) of decoding, in a captured image of the graphic code, a first portion of code produced according to a first coding protocol, by a first standardised application, this first standardised portion of code representing access to a download site for a second application; and
a step (16) of decoding, in a captured image of the graphic code, with the second application, at least a second portion of code produced according to a second coding protocol, this second portion of code representing, jointly with the first portion of code, access to a web resource.

21 Claims, 10 Drawing Sheets

METHOD AND DEVICE FOR ACCESSING A WEB RESOURCE

TECHNICAL FIELD OF THE INVENTION

The present invention relates to a method and a device for accessing a web resource. It applies, in particular, to the field of hybrid games combining a physical component and a virtual component.

STATE OF THE ART

One of the methods commonly used to simplify the transmission of an item of information to a third party is the use of a graphic code which this third party can scan in order to obtain the information. The standardised systems used most frequently for this are barcodes, using for example one of the formats UPC-A (acronym for Universal Product Code), UPC-E, EAN-8 (acronym for European Article Numbering), EAN-13, Code 39, Code 93, Code 128, ITF (acronym for Interleaved 2 of 5), Codabar, MSI (acronym for Micro-Star International, Co), RSS-14 (acronym for Really Simple Syndication), QR (acronym for Quick Response) Code, all these formats corresponding to registered trademarks.

The standardisation of these codes gives them the significant advantage of being readable, recognised and natively decodable by a large number of devices equipped with an image capture device, in particular smartphones, tablets and computers.

Barcodes are ideal for graphically coding an item of information that is complex and hard to remember by the third party to whom the information is transmitted (for example, a long URL, acronym for "Uniform Resource Locator", commonly called "web address"). This address is used to designate a resource on the web by a string of ASCII (acronym for American Standard Code for Information Interchange) characters. The resources can be of different kinds, e.g. web page, video, audio, image, animation, email address, etc.

However, barcodes are also used to identify the instance of an entity that is intended to be unique (such as the right to enter a private site, a numbered seat in a concert, a non-transferable discount coupon, etc.).

For example, after buying a concert ticket online, a consumer receives a ticket to be printed that includes a barcode. This barcode is then scanned by the attendant at the entrance to the venue of the event.

This code is generally formed of many characters, making its determination difficult, but not impossible, for an ill-intentioned person.

In some cases, a publicly accessible medium (web site, scanner software application, etc.) gives users the possibility of verifying the legitimacy of a code. An ill-intentioned user could use this medium to generate codes by determination and by brute-force attack. The scope of the attack can be limited by scanning the IP address of the user making the request, but if this user uses a botnet network he can pose as multiple legitimate users. "Botnet" is a generic term that refers to a group of programmable devices that are infected and controlled remotely by a hacker. The botnets are generally created by a computer hacker or a small group of hackers who use malware to infect a large number of devices. Access to libraries enabling these codes to be generated is public.

Knowing the underlying code, an ill-intentioned person is able to print the barcode corresponding to a purchase. In this way he establishes a fake, allowing its user to claim the good or service acquired at the expense of the actual purchaser.

DESCRIPTION OF THE INVENTION

The present invention aims to remedy all or part of these drawbacks.

To this end, according to a first aspect, the present invention envisions a method for accessing a web resource, which method comprises:
- a step of capturing, by a user terminal, at least one image of an object bearing a visible graphic code comprising two portions;
- a step of decoding, in a captured image of the graphic code, a first portion of code produced according to a first coding protocol, by a first application, this first portion of code representing access to a web page;
- a step of decoding, in a captured image of the graphic code, at least a second portion of code produced according to a second coding protocol different from the first coding protocol, this second portion of code representing, in combination with the first portion of code, access to a web resource;
- a step of verifying the match between a pair of items of information, comprising one item of information decoded in the first portion of the graphic code and one item of information decoded in the second portion of the graphic code, and an authorised pair of items of information; and
- if these items of information match items of information stored in memory, a step of receiving a token to access the resource.

Thanks to these provisions, the graphic code makes it possible to access a web resource with a standardised public code and a proprietary code.

Thanks to these provisions, any communicating device equipped with an image capture device and a reader of a standardised visible code, for example a QR code (registered trademark), can access a web resource for a virtual game.

It is noted that a "QR code" (QR being the acronym for "Quick Response") refers to a 2D barcode comprised of black square modules contained in a white square. The QR code enables rapid decoding.

The present invention means the publisher of the graphic code to be scanned can give a third party, offering a good or a service, the opportunity of communicating to an assignee the title certificate of a good of service to be claimed. Once issued and displayed (or printed), this graphic code guarantees the issuer that this good or service will only be claimed once, and solely by the legitimate assignee.

The issuing and reading method:
- is simple and offers a seamless user experience;
- ensures the uniqueness of the instance concerned; and
- provides a reliable decoding method limiting fraud.

In some particular embodiments, the method comprises:
- a step of transmitting at least one image captured by the user's terminal to a web page identified by the first portion of code; and
- a step of reading the second portion of code by the server hosting said page.

In some particular embodiments, the method comprises a step of transmitting at least one image captured by the user's terminal to a web page identified by the first portion of code, the step of verifying the match being performed with the server hosting said page.

In some particular embodiments, the second portion of code comprises a checksum, and the method also comprises a step of verifying the control code of the second portion of code.

In some particular embodiments, the step of decoding, in a captured image of the graphic code, the first portion of code representing access to a download site for a second application; and the step of decoding, in a captured image of the graphic code, the second portion of code is performed by implementing the second application.

In some particular embodiments, the step of verifying the match comprises a step of transmitting both an item of information decoded in the first portion of the graphic code and an item of information decoded in the second portion of the graphic code.

In some embodiments, the first portion of the graphic code comprises rectangular cells, the colour of each rectangular cell representing an item of information and the second portion of the graphic code comprising triangular cells, the colour of each triangular cell representing an item of information.

Thanks to these provisions, the two portions of code are easily distinguished during reading and decoding steps.

In some embodiments, the method that is the subject of the invention also comprises a step of locating, in a captured image of the graphic code, a perimeter geometry surrounding the first and second portions of the graphic code.

Thanks to these provisions, the combined code comprising the two portions of the graphic code is easily located, and the reframing, in angles, deformation of perspective and position, is quicker and more reliable, which prevents errors in reading the code.

In some embodiments, the first graphic code portion represents access to information on availability for said resource.

Thanks to these provisions, a user with a smartphone can, without having to download the second application, check that the graphic code corresponds to an available product or service. The transactions, such as an exchange or sale, involving the graphic code are therefore made secure by the easy verification of the actual availability of the product or service corresponding to this graphic code.

In some embodiments, the first graphic code portion and the second graphic code portion have no correlation with each other, neither of these graphic code portions being derived from the other.

Thanks to these provisions, a brute-force attack, which might make it possible to discover the information represented by the first graphic code portion, gives no indication concerning the information represented in the second graphic code portion.

In some embodiments, the second graphic code portion surrounds the first graphic code portion.

This "concentric" configuration allows the combined codes to be managed without ambiguity: as the second graphic code portion with its perimeter serves as a container for the first, standardised, graphic code portion it is effectively not possible to confuse it with another code that may be nearby.

In some embodiments, the first graphic code portion is unique and represents a uniform resource locator (URL).

Thanks to these provisions, the first graphic code portion identifies a single instance of a good or a service made available through the graphic code.

In some embodiments, the method that is the subject of the invention comprises: a step of transmitting both an item of information decoded in the first portion of the graphic code and an item of information decoded in the second portion of the graphic code and,—if these items of information match items of information stored in memory, a step of receiving a token to access the resource.

Thanks to these provisions, a secure token having the same structure can be issued for a group of product or service providers.

In some embodiments, the method that is the subject of the invention comprises, if the decoded items of information do not match items of information stored in memory, a step of temporarily blocking the joint transmission of information and/or the issuing of an access token.

Thanks to these provisions, a brute-force attack is not possible.

According to a second aspect, the present invention envisions a device for accessing a web resource, which device comprises:
  a means for capturing, by a user terminal, at least one image of an object bearing a visible graphic code comprising two portions;
  a means for decoding, in a captured image of the graphic code, a first portion of code produced according to a first coding protocol, by a first application, this first portion of code representing access to a web page;
  a means for decoding, in a captured image of the graphic code, at least a second portion of code produced according to a second coding protocol different from the first coding protocol, this second portion of code representing, in combination with the first portion of code, access to a web resource;
  a means for verifying the match between a pair of items of information, comprising one item of information decoded in the first portion of the graphic code and one item of information decoded in the second portion of the graphic code, and an authorised pair of items of information; and
  a means for transmitting to the terminal, if these items of information match the items of information stored in memory, a token to access the resource.

According to a third aspect, the present invention envisions a graphic code for carrying out the steps of the method that is the subject of the invention, which comprises:
  a first portion of code produced according to a first coding protocol, this first portion of code representing access to a web page; and
  a second portion of code produced according to a second coding protocol, this second portion of code representing, in combination with the first portion of code, access to a web resource.

In some embodiments, the second graphic code portion surrounds the first graphic code portion. In some embodiments, at least one portion is concealed by an opaque ink that can be removed with a finger.

According to a fourth aspect, the present invention envisions an identification document comprising a graphic code that is the subject of the invention.

According to a fifth aspect, the present invention envisions a bank card comprising a graphic code that is the subject of the invention.

According to a sixth aspect, the present invention envisions a document for accessing a site comprising a graphic code that is the subject of the invention.

According to a seventh aspect, the present invention envisions an electronic signature document comprising a graphic code that is the subject of the invention.

As the particular features, advantages and aims of this graphic code, this device, this identification document, this bank card, this access document and this electronic signature document are similar to those of the method that is the subject of the first aspect of the invention, they are not repeated here.

BRIEF DESCRIPTION OF THE FIGURES

Other advantages, aims and particular features of the invention will become apparent from the non-limiting description that follows of at least one particular embodiment of the method and device that are the subjects of the present invention, with reference to drawings included in an appendix, wherein.

DESCRIPTION OF THE EMBODIMENTS

The present description is given in a non-limiting way, in which each characteristic of an embodiment can be combined with any other characteristic of any other embodiment in an advantageous way.

Note that the figures are not to scale.

Although the present invention relates to access to any type of resource, goods or service, the description that follows will focus on applications for accessing resources, goods or services, for a virtual game.

Figure 1:
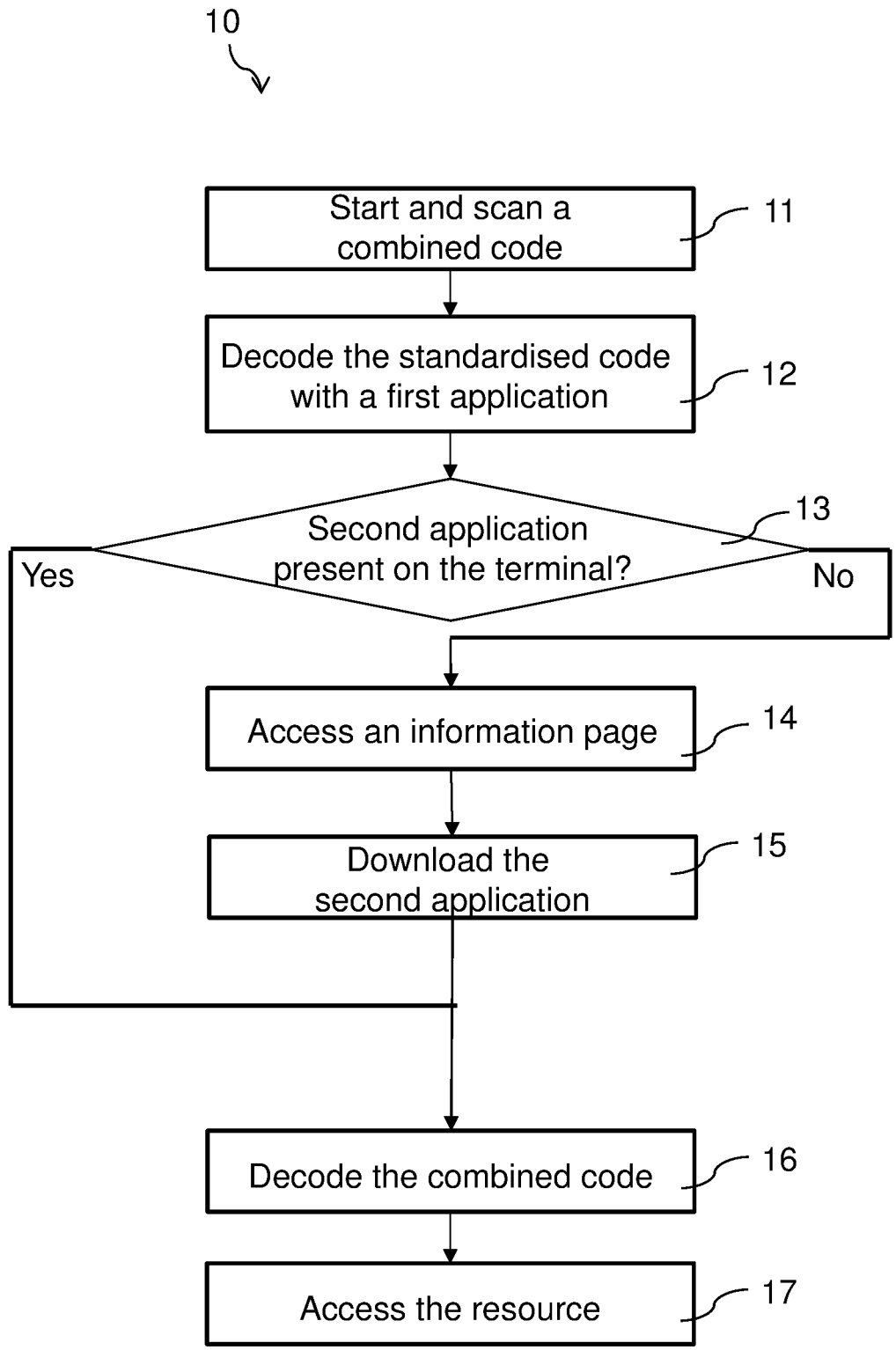
FIG. 1 represents, schematically, in the form of a logical diagram, steps in a first particular embodiment of the method that is the subject of the invention.

FIG. 1 shows a first embodiment of the method 10 for accessing a web resource that is the subject of the invention. This method 10 comprises:
  a step 11 of capturing, by a terminal, at least one image of an object bearing a visible graphic code comprising two portions;
  a step 12 of decoding, in a captured image, a first portion of code produced according to a first coding protocol, by a first standardised application, this first standardised portion of code representing access to a download server for a second application;
  during a step 14, the terminal accesses an information page stored in the server 46, which describes the availability of the good or service concerned by the standardised, and proposes the installation of the second application enabling the acquisition of a good or a service to be confirmed;
  if, during a step 13, it is determined that the second application is not already available to the terminal, or if the user requests it, then during a step 15 the terminal downloads the second application, from the information page.

The description of the availability of the good or service makes it easier to transfer or exchange combined codes between users, in particular when one of the codes, typically the enriched code, is concealed, for example by an opaque ink that can be removed with a finger. For example, if a person wants to exchange or sell one of its cards, the buyer can verify the validity of the card through the availability status of the good or service, by directly scanning this card with his communicating terminal equipped with the standardised code reader. When the terminal accesses this page, the server hosting this page makes a call to a database identifying goods and services in order to verify the availability of the good and service associated to the standardised code 26;
  a step 16 of decoding, in a captured image, a combined code, as described with reference to FIGS. 5 and 6, with the second application, this combined code comprising a second portion of code produced according to a second coding protocol, this second portion of code representing, jointly with the first portion of code, access to a web resource for at least one virtual game; and
  a step 17 of accessing the web resource.

The present invention therefore utilises a double graphic code to be scanned. This graphic coding system makes it possible to decode and verify a digital signature or identifier representing a good or a service in order to have access to them.

Figure 2:
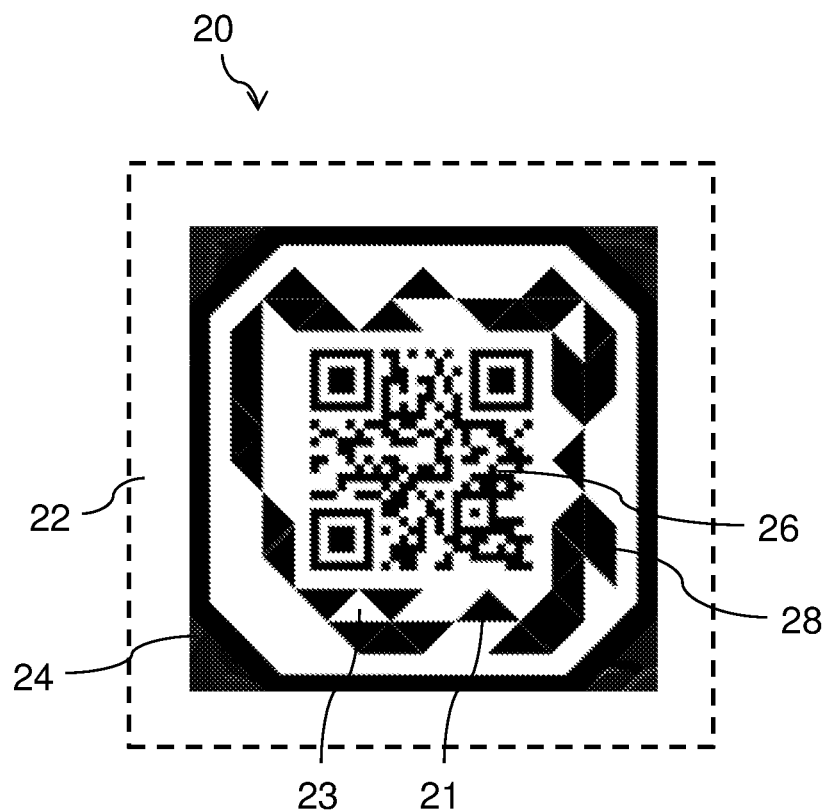
FIG. 2 represents a first example of a combined code.

The double graphic code 20, or combined code, is formed of three concentric levels of information, as shown in FIG. 2:
  the perimeter 24 is a geometric shape that can be recognised thanks to the strong contrast of its edges with the support 22 of the code 20;
  a standardised graphic code 26, for example placed at the centre of the code 20; and
  an enriched graphic code 28 surrounding the standardised graphic code 26 and encapsulated in the perimeter shape 24.

The codes, standardised 26 and enriched 28, surrounded by the perimeter shape 24 have no correlation with each other, neither of these codes 26 and 28 being derived from the other.

The generation and association of the codes 26 and 28 are purely random or quasi-random and are carried out at the time the double code 20 is issued.

The preferred encapsulation of the standardised code 26 within the enriched code 28 and the associated decoding method, described below, guarantee:
  for the person that scans the double code 20, the reliability of the identification of the good to be acquired; and
  for the issuer of the code, the legitimacy of the acquisition, significantly reducing the possibility of fraud.

In the presence of a physical representation of the double code 20, for example printed on a ticket or displayed on a web page following a purchase, a user can use a communicating terminal able to read the standardised barcodes and equipped with an image capture device for scanning them, i.e. for capturing at least one image of them. For example, the terminal is a mobile telephone. The device therefore detects the standardised code 26 first of all, with a first application. Once decoded, this standardised code 26 reveals the internet address of a dedicated page solely for the good to be acquired, the standardised codes thus being unique.

Figure 3:
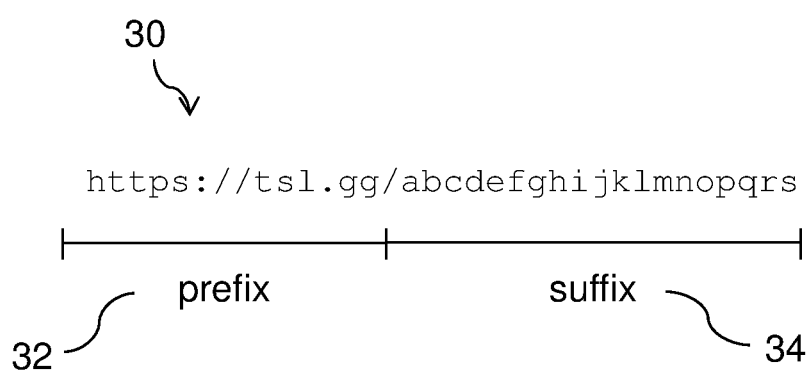
FIG. 3 represents an example of a message represented by a standardised code.
Figure 4:
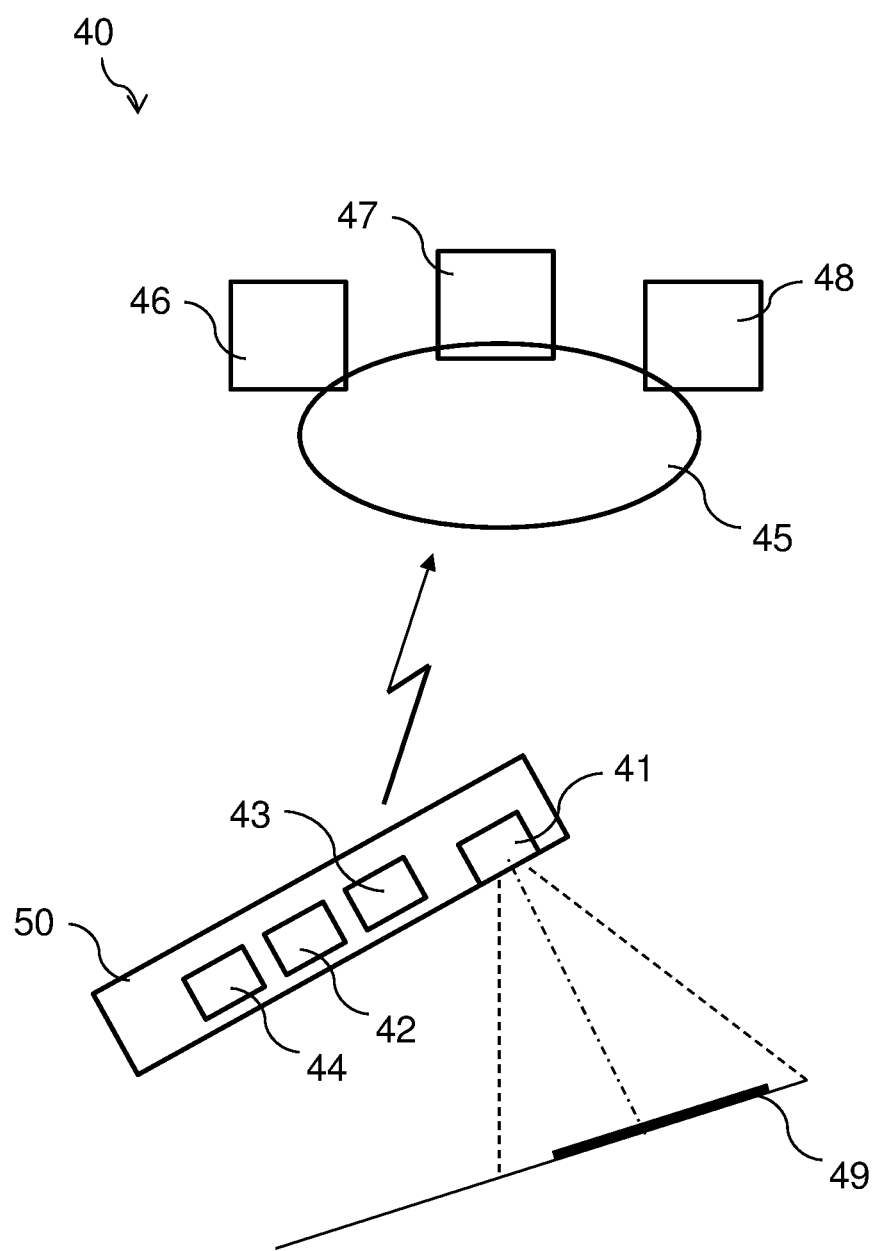
FIG. 4 represents a device that is the subject of the invention.

As shown in FIG. 3, the message 30 represented by the standardised code 26 comprises two portions:
- the prefix 32: the domain name with its protocol towards which the user must be directed (in the example shown: "http://tsl.gg/"). The prefix is also used to identify the context in which the good exists (a legal entity, an organisation, a business, a game, an application, a theme, a series, etc.). It is preferable for it to be as short as possible (and therefore to favour a brief domain name) in order to leave more characters for the suffix 34; and
- the suffix 34: an alphanumeric code whose characters are compatible with an internet address (lower-case letters, upper-case letters, and the symbols "minus" and "underline"/"underscore").

To utilise the present invention, the user utilises a device 40 that comprises a communicating terminal 50 and servers 46, 47 and 48 available on the internet. The user has the terminal 50 comprising an image capture device 41, a controller 42, a communication means 43 and an applications memory 44. The terminal 50 is typically a smartphone. The image capture device 41 is configured to capture a clear image of a combined code 49 materialised, e.g. printed, on a support. The communication means 43 allows the terminal to access the web 45, to which the following are connected:
- A server 46 for displaying the product or service associated to the standardised code and downloading applications;
- A server 47 for verifying the double code; and
- A server 48 for the distribution of goods or services.

Note that the databases mentioned in the present patent application can be blockchains or more traditional databases.

The communication means 43 is, for example, a mobile telephone network or a box, an electronic unit made available by the internet service provider, and linking the user's telecommunications equipment to networks, including the internet network.

The applications memory 44 contains basic applications, such as a first application for reading standardised codes 26, in particular one-dimensional barcodes, two-dimensional barcodes or QR codes. The applications memory 44 is also configured to hold, after downloading by the communication means 43 from the server 46, a second application for reading the standardised code 26 and the enriched code 28. The controller 42 is configured to run the first and second application on the images captured successively by the image capture device 41.

Figure 5:
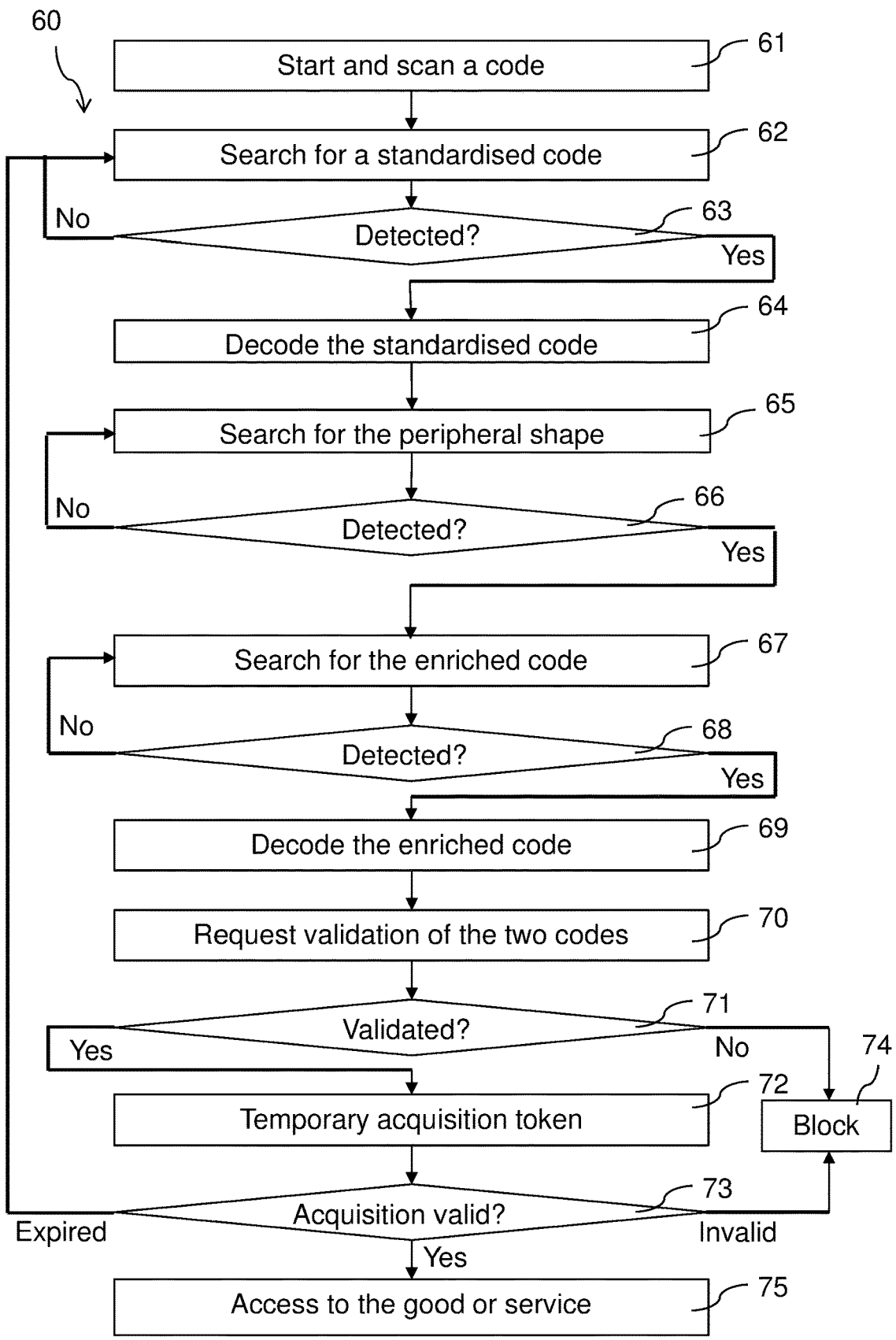
FIG. 5 represents, schematically, in the form of a logical diagram, steps in a second particular embodiment of the method that is the subject of the invention.

FIG. 5 describes steps in a particular embodiment of the method 60 that is the subject of the present invention. After the second application has been downloaded from the application server 46 onto his terminal 50, a user launches this second application that allows the enriched code 28 to be read. The second application prompts the user to create an account, if he has just downloaded the second application, or to log in (with a username and a password) if he already has an account, i.e. he has already used the second application. Once started, the second application launches a module processing the stream of images supplied by the image capture device 41 of the terminal 50.

During a step 61, the user uses his communicating terminal 50 to capture an image of the combined code. During a step 62, the second application searches, in the stream of captured images, for a standardised code 26. As soon as a standardised code 26 is detected, during a step 63, the standardised code 26 is decoded during a step 64.

Preferably, to prevent frauds through a brute-force attack or requests triggered by robots, the number of read attempts are limited for each user terminal, for example by recognising its IP (acronym for Internet Protocol) address. However, as explained above, it is still possible to obtain a standardised code through this method.

In the scenario where the standardised code 26 might be discovered (by deduction), the hacker obtains the information that the good or the service is available. However, they cannot be acquired by the hacker because the standardised code is not sufficient to carry out this acquisition.

In order to have access to the good or service, he would next need to:
- predict the enriched code 28; and
- make an acquisition request to the server 47, providing the standardised code 26 and the enriched code 28.

As described below, a temporary block of the combined code prevents this second brute-force attack.

Note that, once printed on a physical medium, the standardised code 26, the enriched code 28, or both can optionally be protected by scratch-off opaque ink. The presence of this opaque ink undeteriorated on the support guarantees, to the user who has this support, the availability of the good or service via a visual check requiring no mechanical or digital method.

The module processing the image supplied by the image capture device 41 of terminal 50 searches, during a step 65, for the geometric shape of the perimeter 24 of the code 20. In the embodiment of the double code 20 shown in FIG. 2, this perimeter 24, in black on a white background, has an outer square geometric shape and an inner octagonal geometric shape.

During step 65, the module detects the peripheral shape 24 of the code 20 by means of:
- its specific geometric shape (octagonal in a square, in the example shown);
- the strong contrast between its contour and its inner edge.

If the peripheral shape 24 is identified then, during a step 66, a module 28 for detecting enriched code searches for the presence of the enriched code 28 in the double code 20, during a step 67.

This module continues to read the stream of images supplied by the image capture device and searches for the graphic elements that allow the enriched code 28 to be recognised.

This enriched code 28 is preferably comprised of a set of symbols having a detectable geometric shape. In the example shown in FIG. 2, the symbols of the enriched code 28 are right-angled isosceles triangles.

Each symbol can exist in two visible states:
- active: in a dark colour (e.g. symbol 21);
- inactive: in a light colour (e.g. symbol 23).

The right-angled isosceles triangle is a preferred geometric shape because:
- it is a simple shape that is easy to identify and recognise, very different from the squares and lines of the most common barcodes, such as the code 26,
- it has the minimum number of edges for a geometric shape; and
- it has the optimum ratio of the dimensions of the symbol on the surface it occupies.

The combination of the symbols of the enriched code 28 and their active or inactive state forms a binary code whose digital score is dependent on the number of symbols. For example, in the order that symbols in the enriched code 28 are read, the active states are associated to the binary number "1" and the inactive states to the binary number "0". The digital score is therefore equal to two to the power n, where n is the number of symbols in the enriched code 28. Note that if a symbol can take three states, for example black, grey and white, this digital score is three to the power n.

With the aim of preventing an enriched code 28 being obtained by prediction, or at least making it as difficult as possible, it is preferable to increase the number n of symbols it contains and/or the number of states/colours that each symbol can take.

In the embodiment shown in FIG. 2, the enriched code 28 contains 70 symbols that can take two states, which corresponds to about 1.18 trillion combinations.

Note that the symbols must be sufficiently large and contrasted to be clearly visible by a low-quality image capture device, without autofocus, and at a relatively long distance, e.g. at arm's reach. The printed surface of the combined code 20 is de facto dependent on the size of the symbols and on their number.

Once the enriched code 28 is detected during a step 68, it is decoded and the binary code is obtained, during a step 69. With this binary code and the code obtained by decoding the standardised code, the second application requests the server 47 for a validation of the combined code, during a step 70.

One of these codes can optionally be used to display a graphic representation (in two dimensions, three dimensions or augmented reality) of the good or service concerned, on the screen of the device in the process of scanning it. For example, this graphic representation is a game character or an item that can be used in a game.

Once the two codes, standardised 26 and enriched 28, have been obtained, a request asking for verification of the availability is sent to the server 47. This request represents the two codes, standardised 26 and enriched 28, that have been read, for example by including them in full.

During a step 71, the server 47 verifies that the two codes sent match the codes of a good or a service to be distributed and, if this is the case, it sends a temporary acquisition token to the terminal, during a step 72. Preferably, this token has a very short validity period, for example a few seconds.

If the two codes, standardised 26 and enriched 28, do not match the codes of a good or a service to be distributed, this could indicate a fraudulent request attempt. The issuing of a token representing the good or service is blocked right from the first failed attempt, during a step 74, for a long period, for example 24 hours. The IP address of the terminal that sent the request is also excluded for the same period. For a given standardised code 26, and an enriched code 28 comprised of 70 symbols, there is only one correct enriched code among the 1.180 Trillion codes available. Therefore, the malicious user has only one chance in 1.18 Trillion of obtaining the enriched code by deduction. This method makes it practically impossible for a brute-force attack to succeed.

If the rightful owner of this code makes a scan during the interval in which the good or service he has acquired is blocked following a hacking attempt, a message informs him that the good is temporarily blocked and he can only claim his acquisition at the end of the long period.

Once the token has been obtained, the provision of the good or service can only be requested by supplying, during a step 73, with the request sent to the server distributing this good or service, the valid temporary acquisition token during the short period following its issuing.

If the server distributing the good or service determines that the token is invalid, the good or the service is blocked and the IP address of the user terminal is excluded for a long period, for example 24 hours, during step 74.

If this distribution server determines that the token has expired, the distribution server notifies the second application on the user terminal of this, and this second application prompts the user to re-scan the double code 20.

If the distribution server determines that the token is valid, the good or the service is associated to the user account identified on the terminal that scanned the double code 20, during a step 75.

The double code 20 is therefore "consumed", the good or service in question is indicated in the database as now being acquired by a user, and therefore unavailable for a future acquisition.

Note that, throughout the description of the steps of FIG. 5, the order in which the enriched code and enriched code are read can be reversed. Nevertheless, the search for the enriched code requires searching for the peripheral shape of the combined code, whereas this is not required to search for the standardised code.

Figure 6:
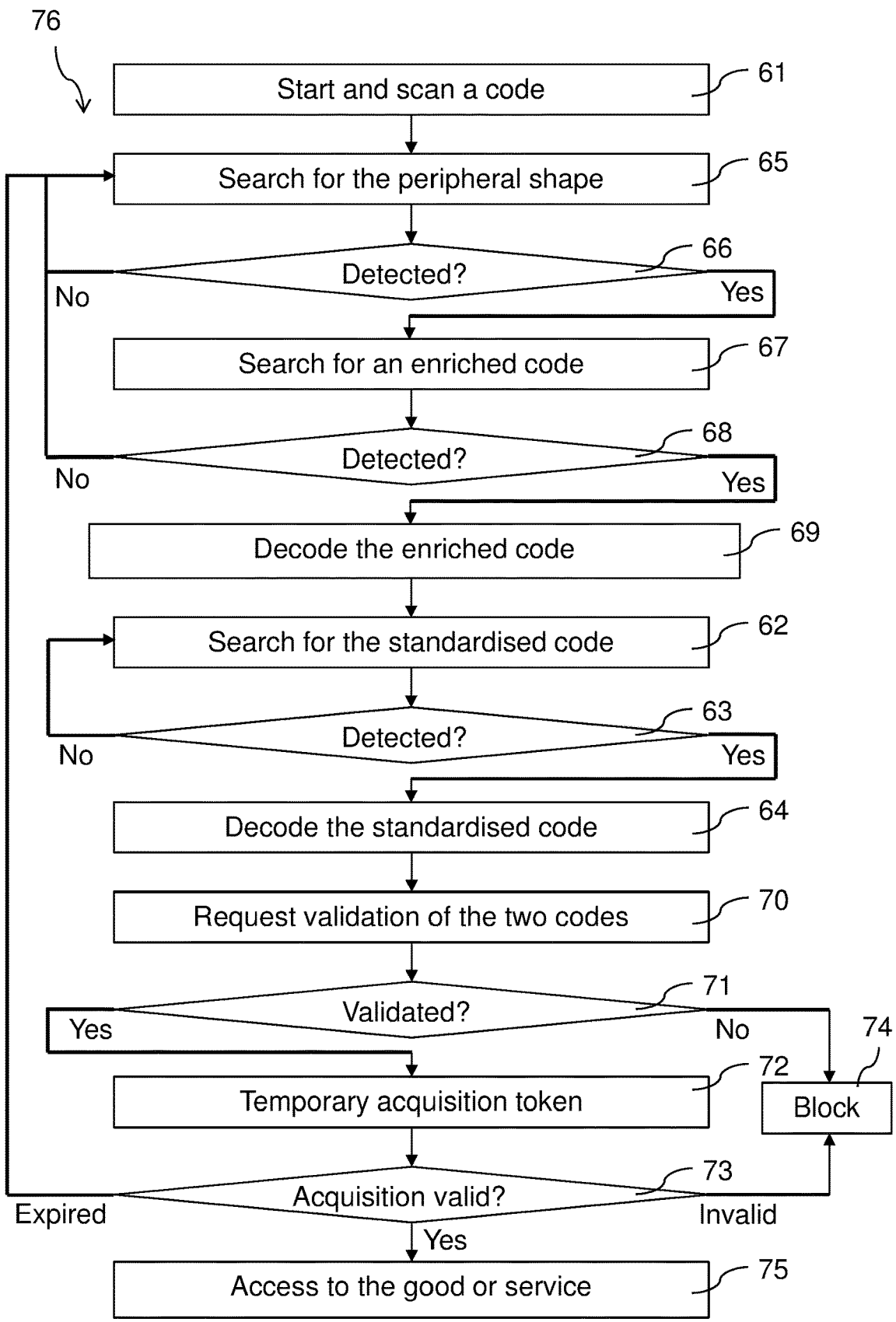
FIG. 6 represents, in the form of a logic diagram, steps in a variant of the second particular embodiment of the method that is the subject of the invention.

In the variant 76 of this embodiment described in FIG. 6, which corresponds to this reversal, the order of the steps becomes 61, 65, 66, 67, 68, 69, 62, 63, 64 and 70 to 75 (the order of which is not changed). Note that the respective roles of the standardised and enriched codes can be reversed:
  The enriched code makes it possible to access the information on the availability of the good or service;
  The standardised code supplements the enriched code to obtain validation of the acquisition.

In some variants of each of the embodiments shown in FIGS. 5 and 6, the search for the perimeter (steps 65 and 66) is omitted.

Figure 7:
FIG. 7 represents a card bearing a combined code and other information.

FIG. 7 shows an example of a card 80 bearing a combined code 81. This card also contains a number 83, a representation 84 of a game character, a name 85 of the game character, a multipoint code 82 and attribute values 86.

In the context of the game, summoning a character with a card bearing the combined code 81 takes place as follows.

During a match (a combat), during specific phases of the game, each player must summon creatures, accessorise the creatures already summoned, or interrupt his opponent's actions. These creatures, accessories or interruptions are represented by cards, each benefiting from a unique enriched double code. By means of a communicating terminal equipped with an image capture device, the player whose turn it is scans the cards he wants to summon.

Note that the opponent can be present, in the same room as the player in question, their respective communicating terminals being connected together via a network protocol (for example Bluetooth, local network). The opponent can also be remote and connected through the internet via a game server.

The player can only summon the cards that he owns, i.e. that he has previously scanned associating them to his player account.

This guarantees the legitimacy of the cards scanned:
  to the opponent: the cards played do belong to the player. He will not win dishonestly;
  to the organiser of the tournament, if applicable: the cards played are not fraudulent copies;
  to the developer of the game: the balance of the developer's game is not impaired by the addition of counterfeit cards.

The combined code 81 identifies a creature represented in a unique way by the representation 84, and therefore determines its characteristics in memory (cost of summoning represented by the number 83, i.e. the amount of energy required to summon it, and, according to the attribute values 86, its power of attack, its ability to carry heavy accessories, and its defence). The game can therefore accept, refuse and therefore react as a consequence of a summons initiated by a player.

During a summons, if the card is legitimate, recognised and complies with the rules of the game, the character is displayed on the screen of the player concerned, and also on the screen of his opponent, even if remote.

Detection of the combined code 81 enables the application of the game to represent the character in augmented reality in the state it is supposed be in the match. Through the uniqueness of the combined code 81, the application is able to recognise a character already summoned during a match, and display it in a state consistent with what it has undergone.

For example, if the character has died in the combat, recognition of its code allows this character to be displayed stretched out and lifeless. Indeed, a player cannot summon a card where this has already occurred.

Figure 8:
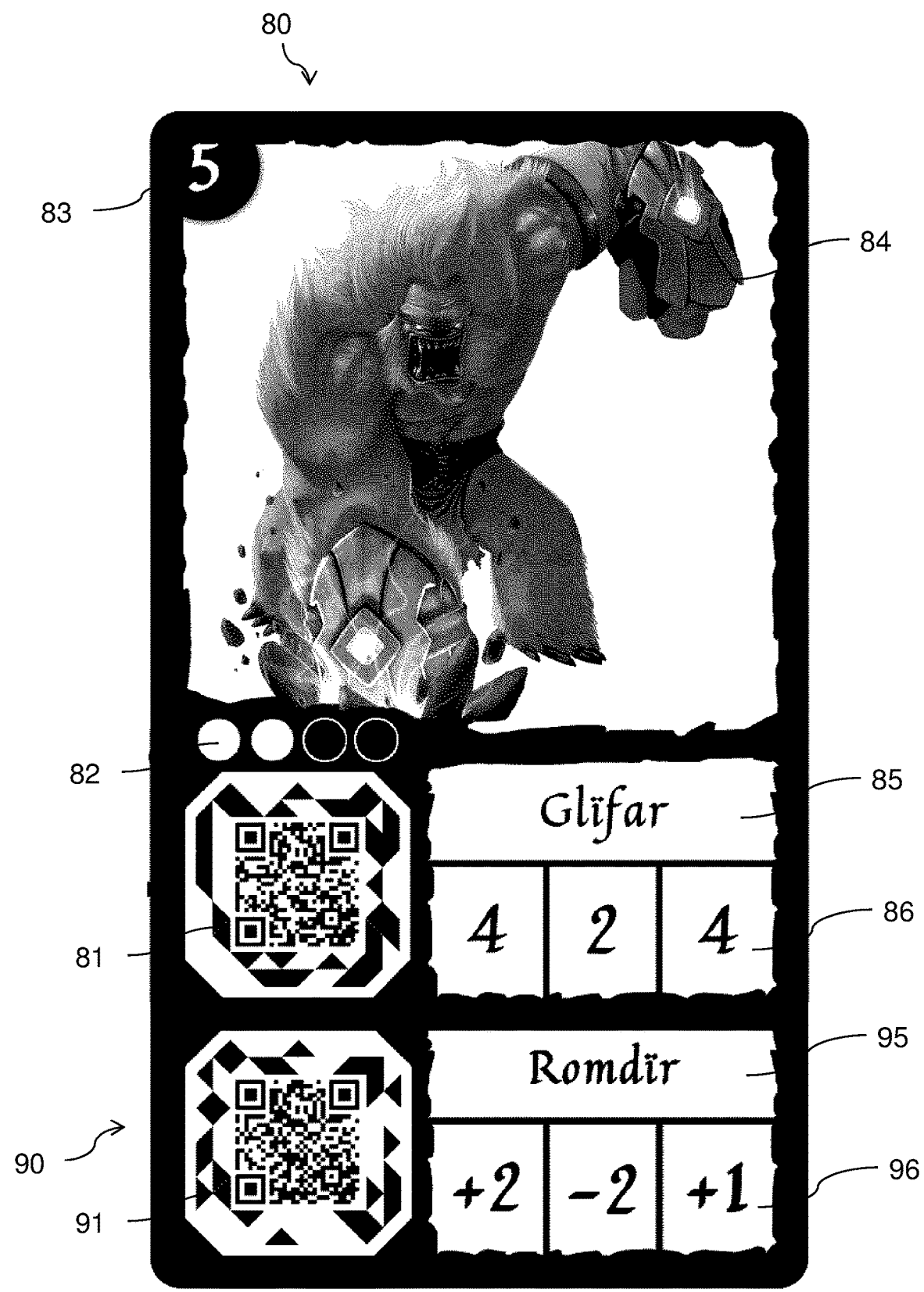
FIG. 8 represents two cards bearing combined codes and other information.

Accessorisation by combining codes is shown in FIG. 8. FIG. 8 shows the card 80 from FIG. 7 overlaid with a card 90, except for its lower portion, representing a combined code 91, the accessory name 95 and the attribute codes 96.

The player can accessorise his creatures in order to change their characteristics (for example, increase the attack power, defence capability, ability to carry heavy accessories) represented by the attribute codes 96.

An accessory is associated to a creature by placing the accessory card 90 under the card 80 for the creature, with the two combined codes 81 and 91 always visible. The proximity of one enriched double code with another enriched code is detected by the second application and the image capture device. This proximity makes it possible to associate these two combined codes 81 and 91. This principle is not restricted to two codes. The player can accumulate the accessories, up to the limit of the rules of the game and the creature's carrying capacity.

FIG. 8 shows that a combination of an accessory with a creature occurs vertically. The application detects the proximity of the two combined codes 81 and 91. The values 86 and 96, located on their right, are added vertically with the corresponding values of the card located below. In the example, thanks to the accessory, the creature expands its capacities to "6" for attack, "0" for carrying, and "5" for defence.

Thanks to the utilisation of the present invention and the certification of the double codes, the opposing player, although remote, has the benefit of knowing that the cards played (in the real world) by his opponent are legitimate with regard to the (numerical) rules laid down by the game. This reduces the possibilities for cheating even though the distance separating the players makes them vulnerable to this problem.

Figure 9:
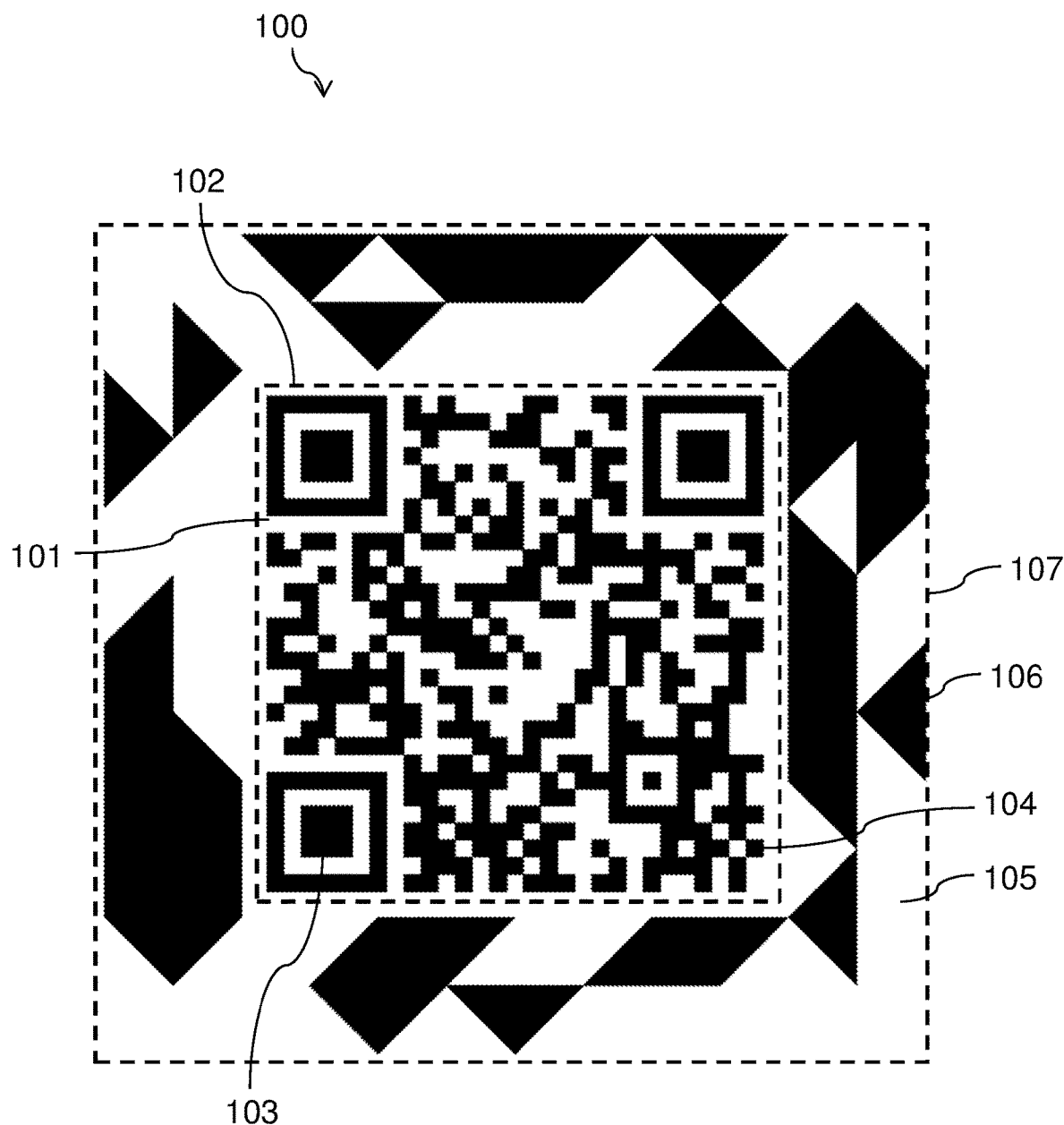
FIG. 9 represents a second example of a combined code.

FIG. 9 shows a combined code 100 comprising, in the centre, a standardised code, typically a QR code 101, and, on the perimeter, a graphic code 105. The code 101 is located inside an area delimited by the dotted line 102. The graphic code 105 is located within an area between the dotted line 102 and the dotted line 107. Of course, these dotted lines 102 and 107 are not printed with the combined code 100 and are only used for the needs of the present description.

The standardised code 101 comprises square cells 104 that can take two values when printed: black or white. These two values correspond to one bit ("binary unit") of data (supplementary code or message, for example for detecting or correcting errors). The code 101 also comprises finder patterns 103 enabling an image processing software system to determine the orientation, the geometric deformation due to the perspective and the position of the code 101 in a scan of the code and its surroundings.

The graphic code 105 comprises geometric cells 106, here triangular, that can take two values once printed, black or white, to represent one data bit. Note that the geometric cells 106 are distributed with a rotational symmetry of 90°. The triangular geometric cells therefore have a right-angle and a hypotenuse always parallel to the side of the line 107 closest to this hypotenuse. This makes it easier to read the binary values represented in the cells 106.

Note that the margin between the central QR code 101 and the perimeter code 105 is sufficient to avoid any confusion for the application that interprets the scan, for example this separation, or margin, is at least two elementary cells of the QR code 101.

Figure 10:
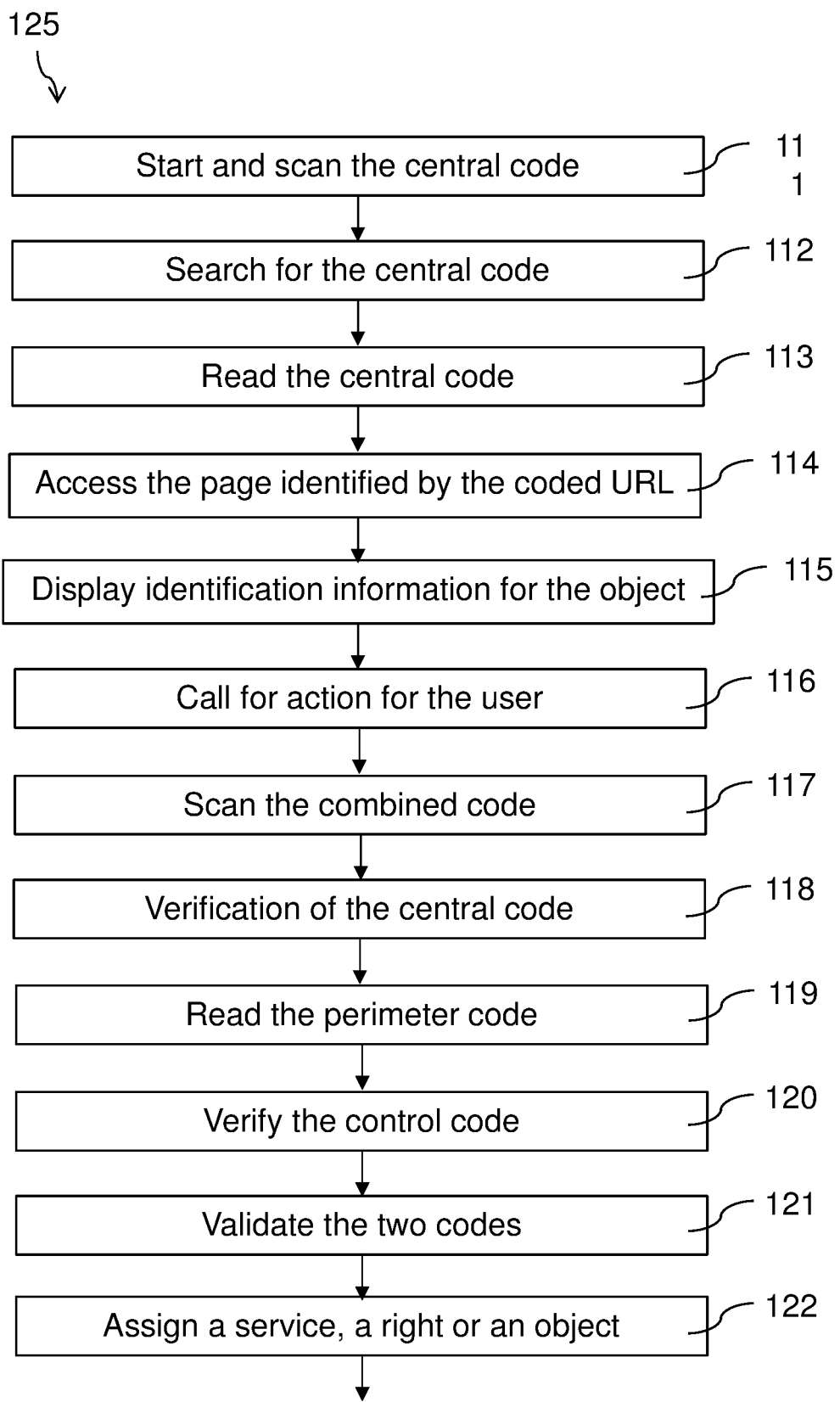
FIG. 10 represents, in the form of a logical diagram, steps in a third embodiment of the method that is the subject of the invention.
Figure 11:
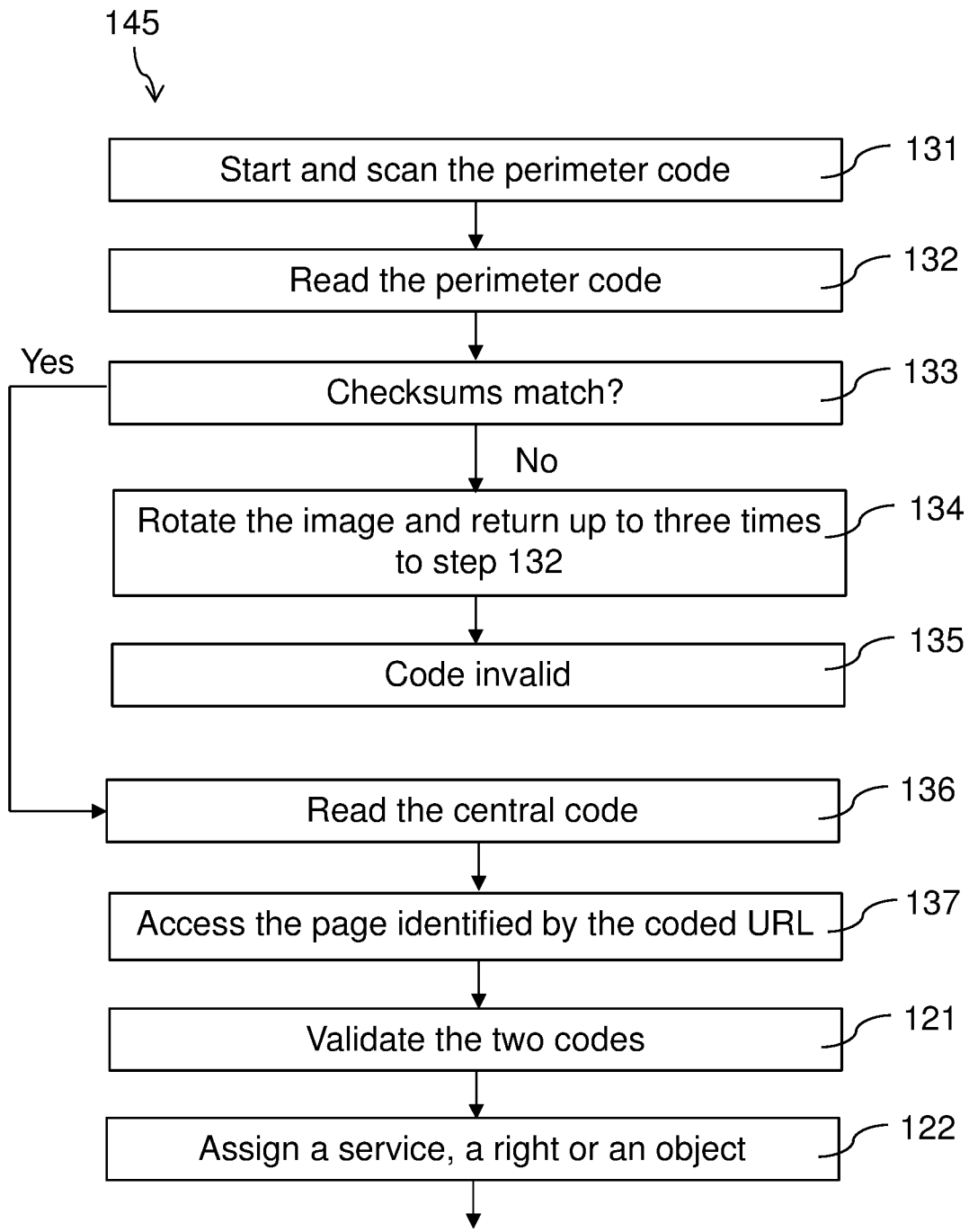
FIG. 11 represents, in the form of a logical diagram, steps in a fourth embodiment of the method that is the subject of the invention.

Two particular embodiments of the method that is the subject of the invention are described below with reference to FIGS. 10 and 11.

With regard to the encoding, the standardised code 101, at the centre of the combined code 100, represents an URL. Therefore, only the characters authorised by the URLs can be encoded in it. The perimeter code 105, for example shown in the form of triangles, represents a string of characters for which the symbols are defined based on the number of combinations desired. For example, a set of six binary values ("bits") corresponds to one of 64 different characters.

The code is formed of a certain number of symbols (the number of symbols is defined based on the maximum size of the characters desired and the surface area available on the support).

For example, for a surface allowing 72 symbols, and a string to be encoded comprising 10 characters, each of the 10 characters will be converted into bits, i.e. 10*6 bits=60 bits=60 symbols. This leaves 12 additional symbols, which can be used for coding a checksum, for example a code for detecting and/or correcting errors (e.g. a cyclic redundancy check, or "CRC"). The purpose of this checksum is to confirm the integrity of the data of the code read during an image capture. This checksum is determined by a mathematical equation based on the string to be encoded. If the checksum does not use all the symbols remaining available, these available symbols can be used for storing a version number of the code, for example. The decoding method can follow two different directions: from the centre towards the perimeter, as shown in FIG. 10, or from the perimeter towards the centre, as shown in FIG. 11.

For the method 125 comprising decoding from the centre of the combined code 100 towards the perimeter, the user's terminal captures an image of the central standardised code 101, step 111. Natively, the "camera" application of a smartphone is able to find, step 112, and read, step 113, the QR code 101 located at the centre of the combined code 100.

This central QR code 101 represents the URL of a web page representing an object (digital or physical) in a unique way, towards which the user is directed. This web page is hosted on a server accessing data enabling this product to be identified and containing the metadata of the object.

During a step 114, the user's terminal accesses this page.

This web page displays public information useful for identifying the object, for example the commercial name of the object, its reference, its description, its serial number and a descriptive photo, step 115.

According to the object's status in the process and the allocation steps specified by the issuer of the combined code 100, during a step 116, calls for actions are proposed to the user, for example the acquisition of property rights to the object, to make it possible to indicate that the object declared lost has been found.

Some of these actions may entail a high level of security, requiring a complete image capture of the combined code, for example for obtaining the property rights to the object. This will be described below. In this scenario, the user is required to once more capture an image of the code to acquire its property rights. In some embodiments, the scanner used to acquire and interpret the combined code is incorporated into the web page. This scanner is used, during a step 117, to simultaneously decode the QR Code and the perimeter code. Therefore, in succession:
- the user is asked to authorise access to the camera of his terminal;
- with this authorisation, the video stream of the camera is displayed on the web page;
- a computer program analyses this video stream image by image;
- the user aims the camera at the combined code; and
- the computer program searches for a QR code in this video stream.

The image is adjusted to compensate for the geometric distortions of the image, for example due to the tilt and orientation of the camera relative to the code, and then converted into a bit matrix to be decoded. If a QR code is found and corresponds to the QR code concerned by the previous steps, step 118, the scanner extends the decoding beyond the geometric surface taken by the QR Code in order to detect the perimeter code there.

If the QR code found does not correspond to the QR code initially read, a message is displayed asking the user to scan the code scanned originally.

Once decoded, the two codes 101 and 105 are transmitted to the server that accesses data enabling the products to be identified. Preferably, this transfer of information is carried out in a secure way via an SSL/TLS tunnel.

The server compares these two codes 101 and 105 with the pairs of codes stored in a database:
- If the two codes 101 and 105 correspond to a single record in the database, then the object is authorised to pass to the next step in its associated process flow (for example, issuing of the property rights),
- If the two codes 101 and 105 do not correspond to a pair of codes stored in the database, the actions and operations that can be carried out on the object corresponding to this pair of codes are inhibited for a given period. This inhibition protects the server against brute-force attacks.

With regard to the matrix of binary values of the perimeter code 105, during the reading of the video stream after adjustment of the image, the purpose of a step 119 of the method is to simplify the reading of this image in order to detect the geometric codes, for example triangles, representing the perimeter code there.

The dimensions of the QR code make it possible to determine the location and dimensions of each geometric symbol forming the perimeter code. The finder patterns of the QR code also make it possible to determines its orientation.

In order to check whether each of the symbols is present or not, an operation to simplify their shape is carried out.

Each symbol is simplified by means of a matrix of modules, each representing a binary value.

For example, a triangle symbol corresponds to a matrix formed of sixteen cells, seven module cells at its base, then five, then three, and one cell at its apex, as shown below:
X
XXX
XXXXX
XXXXXXX Each symbol position is analysed during the decoding. Determination of whether a geometric symbol is present or not is tried by analysing the binary value in each of the cells in the surface of the symbol. If more than 50% of an area for containing a symbol is covered by positive cells, for example white (therefore, 8 of 16 modules in the above example), it represents a positive binary value in the perimeter code. The positive or negative binary value of a cell is determined by comparison with a predefined luminosity limit value (for example the average luminosity for the QR-code).

This operation is preferred because the analysis of the image is not binary. This operation resolves the problems of contrast, flashes of light, brightness, distortion that can affect its reading.

Each geometric area, for example triangular, is read in this way. Then, the N data symbols thus obtained are converted into text.

The remaining symbols are analysed to calculate the checksum.

During a step 120, if the number corresponding to this checksum stored in the code is equal to the number of the checksum calculated based on the captured image, the decoding is considered valid.

A wrong checksum can result from a falsification of the code, a physical alteration of the support, or an environmental fault during the reading.

Choice of the algorithm is determined by the number of symbols that can be used in order to store the digital result of the calculation, and its ability to avoid the collisions that can result in false positives.

One example of the formula applied for calculating the checksum is the Fletcher algorithm.

If the result of the step 120 is positive, during a step 121, the pair of messages represented by the codes 101 and 105 is compared to the pairs of messages stored in the memory of the server.

If there is a match with a pair of codes, during a step 122, the server assigns a service, a right (e.g. an access right or identification of a document such as an identity document or a means of payment) or an object to the user.

In the method 145 comprising decoding from the perimeter of the combined code 100 towards its centre, the checksum of the perimeter code 105 is used to confirm that the code 105 is read in the right direction.

During a step 131, the perimeter code 105 is captured. During a step 132, the perimeter code 105 is captured.

During a step 133, it is determined whether the checksum is incorrect, i.e. if the result of the calculation using the formula for generating this checksum matches the sum read in the perimeter code 105. If not, during a step 134, the code is rotated 90° and the search is repeated. The code 105 is considered invalid, step 135, if none of the four orientations gives a checksum equal to that expected.

If the checksums match, during a step 136, the central standardised code 101 is read. Then, during a step 137, the page identified by the URL represented by the central code 101 is accessed.

The combined code that is the subject of the invention provides advantages with regard to security:

The QR Code can contain an item of information which one accepts to be made public and which is read by a large number of terminals. Therefore, including sensitive information in it is not recommended. When it represents a URL, it is inadvisable to specify a password in it, for example. If the QR code must contain a URL, the identifier of a product, and the password allowing it to be acquired, it must be accepted that this sensitive information will be kept on the user's client workstation, or be read and stored by the tracking software systems. In general, combining the public key and the private key in any single item of information circumvents the very security obtained by the separation of these two codes. It would also require the issuer of the code to strengthen efforts not to communicate the URL (and therefore the code) before obtaining the property rights to the object is proposed to the future acquirer. In addition, a single code gives hackers an opportunity to carry out brute-force attacks to surmise the existence of a code even before the paired object is released. Once the code has been determined, the process for acquiring the object is compromised.

The perimeter code makes it possible to produce a unique proprietary code. A proprietary code means the audience has to be educated about its mode of operation. It cannot, by definition, be scanned and interpreted natively by commercially available computer equipment, unlike the QR code.

The issues mentioned above for the QR code, regarding the security vulnerabilities of a single code, also apply.

A publicly read double code could be considered, for example two juxtaposed QR Codes.

But the terminals are unable to decode two QR codes simultaneously. However, simultaneity is required for a reliable scan and decoding.

It is also not possible to determine which code will be read first if the two codes are present on the screen. Nor is it guaranteed that the device will detect the presence of the second . . . .

And eliminating a QR code from the camera's stream, so as to ensure that the second code is read, is equivalent to scanning a single code, with the problems of a scan of one code.

A combined code that is the subject of the invention, for example comprising a QR Code and a proprietary code, presents many advantages:

this combined code ensures the highest level of security, by storing the public data in a standard QR code (the URL+the identifier of the object), and the private data in a proprietary code;

the QR code is read natively, and only contains public data. Because of this, the URL contained in the QR code contains no sensitive data and can be shared without risk;

the proprietary perimeter code is only read, scanned and decoded in a secure, compartmentalised environment;

a private key must never be included in a URL because that can be logged on both the client and server sides, and also used by trackers in the browsers;

the combined code can be decoded directly in a browser by means of a webcam, eliminating the need to download a specific application, which could impede the adoption of a standard implementing this combined code;

by using our application on the web, with no installation on the user's terminal, the two codes can be read simultaneously:

the first portion of the code (QR code) can be read just by a smartphone camera, which directs the user to a web application allowing him to decipher the second portion if he wants to acquire the property rights;

the fact of scanning the combined code via this web application, on a secure site (for example using the SSL/TLS protocol) ensures that it cannot be intercepted during communication between the client and the server; and just one combination of the two combined codes is valid. It enables the allocation process to be blocked effectively on a single object during a specific period right from the first failed attempt.

The present invention applies in particular to:

identity documents, such as digital passports and ID cards;

bank cards, site access cards or badges for a site;

access to a digital certificate, in particular a certificate or private key or a public key of an asymmetric code, for example of PKI (public-key infrastructure) type;

access to bank accounts;

access to non-physical assets, in particular intangible assets, digital assets or Non-Fungible Tokens (NFTs).

The invention claimed is:

1. Method for accessing a web resource, which method comprises:

a step of capturing, by a user terminal, at least one image of an object bearing a visible graphic code comprising two portions, wherein one of the two portions surrounds the other portion of the two portions;

a step of decoding, in a captured image of the graphic code, a first portion of code produced according to a first coding protocol, by a first standardised application, this first portion of code representing access to a web page;

a step of decoding, in a captured image of the graphic code, at least a second portion of code produced according to a second coding protocol different from the first coding protocol, this second portion of code representing, in combination with the first portion of code, access to a web resource;

a step of verifying the match between a pair of items of information, comprising one item of information decoded in the first portion of the graphic code and one item of information decoded in the second portion of the graphic code, and an authorised pair of items of information; and if these items of information match items of information stored in memory, a step of receiving a token to access the resource.

2. Method according to claim 1, which comprises:

a step of transmitting at least one image captured by the user's terminal to a web page identified by the first portion of code; and a step of reading the second portion of code by the server hosting said page.

3. Method according to claim 1, which comprises a step of transmitting at least one image captured by the user's terminal to a web page identified by the first portion of code, the step of verifying the match being performed with the server hosting said page.

4. Method according to claim 1, wherein the second portion of code comprises a checksum, and the method also comprises a step of verifying the control code of the second portion of code.

5. Method according to claim 1, wherein the step of decoding, in a captured image of the graphic code, the first portion of code representing access to a download site for a second application, and the step of decoding, in a captured image of the graphic code, the second portion of code is performed by implementing the second application.

6. Method according to claim 1, wherein the step of verifying the match comprises a step of transmitting both an item of information decoded in the first portion of the graphic code and an item of information decoded in the second portion of the graphic code.

7. Method according to claim 1, wherein the first portion of the graphic code comprises rectangular cells, the colour of each rectangular cell representing an item of information and the second portion of the graphic code comprising triangular cells, the colour of each triangular cell representing an item of information.

8. Method according to claim 1, which also comprises a step of locating, in a captured image of the graphic code, a perimeter geometry surrounding the first and second portions of the graphic code.

9. Method according to claim 1, wherein the first portion of graphic code represents access to information on availability for said resource.

10. Method according to claim 1, wherein the first portion of graphic code and the second portion of graphic code have no correlation with each other, neither of these portions of code being derived from the other.

11. Method according to claim 1, wherein the second portion of graphic code surrounds the first portion of code.

12. Method according to claim 1, wherein the first portion of graphic code is unique and represents a uniform resource locator or URL.

13. Method according to claim 12, which comprises, if the decoded items of information do not match items of information stored in memory, a step of temporarily blocking the joint transmission of information and/or the issuing of an access token.

14. Device for accessing a web resource, which device is characterised in that it comprises:
  a means for capturing, by a user terminal, at least one image of an object bearing a visible graphic code comprising two portions, wherein one of the two portions surrounds the other portion of the two portions;
  a means for decoding, in a captured image of the graphic code, a first portion of code produced according to a first coding protocol, by a first application, this first portion of code representing access to a web page;
  a means for decoding, in a captured image of the graphic code, at least a second portion of code produced according to a second coding protocol different from the first coding protocol, this second portion of code representing, in combination with the first portion of code, access to a web resource;
  a means for verifying the match between a pair of items of information, comprising one item of information decoded in the first portion (26) of the graphic code (20) and one item of information decoded in the second portion (28) of the graphic code, and an authorised pair of items of information; and
  a means for transmitting to the terminal, if these items of information match the items of information stored in memory, a token to access the resource.

15. Graphic code for carrying out the steps of the method according to claim 1, which code comprises:
  a first portion of code produced according to a first coding protocol, this first portion of code representing access to a web page; and
  a second portion of code produced according to a second coding protocol, this second portion of code representing, in combination with the first portion of code, access to a web resource;
  wherein one of the two portions surrounds the other portion of the two portions.

16. Graphic code according to claim 15, wherein the second portion of code surrounds the first portion of code.

17. Graphic code according to claim 15, of which at least one portion is concealed by an opaque ink that can be removed with a finger.

18. Identification document comprising a graphic code according to claim 15.

19. Bank card comprising a graphic code according to claim 15.

20. Document for accessing a site comprising a graphic code according to claim 15.

21. Electronic signature document comprising a graphic code according to claim 15.

* * * * *